United States Patent [19]
Sawyer et al.

[11] Patent Number: 5,946,629
[45] Date of Patent: *Aug. 31, 1999

[54] CELLULAR TELEPHONE NETWORK HAVING SHORT MESSAGE SERVICE INTERACTION WITH OTHER NETWORKS

[75] Inventors: Francois Sawyer, St.-Hubert; Eric Turcotte, Ilea Des Soeurs; Wayne Tom, St. Laurent, all of Canada

[73] Assignee: Telefonaktiebolaget L M Ericsson

[*] Notice: This patent issued on a continued prosecution application filed under 37 CFR 1.53(d), and is subject to the twenty year patent term provisions of 35 U.S.C. 154(a)(2).

[21] Appl. No.: 08/563,680

[22] Filed: Nov. 28, 1995

[51] Int. Cl.⁶ .................................................. H04Q 7/22
[52] U.S. Cl. ......................... 455/466; 455/426; 455/560
[58] Field of Search ................................. 379/58, 59, 63, 379/89, 57; 455/33.1, 53.1, 54.1, 403, 422, 426, 454, 466, 550, 552, 560

[56] References Cited

U.S. PATENT DOCUMENTS

| | | |
|---|---|---|
| 4,654,867 | 3/1987 | Labedz et al. . |
| 4,760,572 | 7/1988 | Tomikawa . |
| 5,276,731 | 1/1994 | Arbel et al. . |
| 5,351,235 | 9/1994 | Lahtinen ................................. 455/53.1 |
| 5,487,100 | 1/1996 | Kane ........................................ 379/57 |
| 5,497,373 | 3/1996 | Hulen et al. ........................... 379/89 X |
| 5,604,788 | 2/1997 | Tett ......................................... 379/58 |
| 5,625,670 | 4/1997 | Campana, Jr. et al. .................. 379/58 |

FOREIGN PATENT DOCUMENTS

| | | |
|---|---|---|
| 92/14330 | 8/1992 | WIPO . |
| 9214329 | 8/1992 | WIPO . |
| 9708906 | 3/1997 | WIPO . |

OTHER PUBLICATIONS

2nd International Workshop on Mobile Multi-Media Communications; Proceesdings 2nd International Workshop on Mobile Multimedia Communications, Bristol; UK, Apr. 11-13, 1995; Bristol University Chemistry Building; Bristol, UK, OP (A1/5/pp. 1-6); XO 000671022; *HP Open Mail Short Message Service (SMS) Gateway, The Mobile Phone as an E-Mail 'Client-of-Choice'*; By Steve Smale.

Proceedings of the Global Telecommunications Conference (Globecom); Houston, Nov. 29-Dec. 2, 1993; vol. 1 of 4, Nov. 29, 1993, Institute of Electrical and Electronics Engineers, XP000428085; *A Mobile Pen-Based Computing System for Cellular Telephone Networks*; Nov. 29, 1993; By: T.Hoshi, et al.; (pp. 350-384).

Speakers' Papers; 6th World Telecommunications Forum; part 2; Technical Symposium; Integration, Interoperation and Interconnection; The Way to Global Services, Geneva, Switzerland, Oct. 10-15, 1991. Oct. 1991, 1991, Geneva, Switzerland, pp. 375-378; vol. 2, XP000612365; *GSM PLMN Makes a Mobile Office Viable*; by Petri Pöyhönen et al.

*Primary Examiner*—Dwayne D. Bost
*Assistant Examiner*—William G. Trost
*Attorney, Agent, or Firm*—Jenkens & Gilchrist, P.C.

[57] ABSTRACT

A method and apparatus for facilitating inter-network message communications within the framework of a cellular telecommunications network. The message center of the cellular network includes functionality for processing received messages and forwarding the received messages between the cellular network and other connected networks. Each message handled by the message center includes a destination identifier in the text field of the message which identifies not only the delivery destination (addressee) for the message, but also the network over which the message is to be transmitted in order to reach the identified delivery destination. In the preferred embodiment of the invention, the message center functionality facilitates inter-network communications among and between a cellular network (using SMS message format transmissions), a conventional telephone network (using facsimile message format transmissions), and a wide or local area network (using e-mail message format transmissions).

27 Claims, 4 Drawing Sheets

CELLULAR TELEPHONE NETWORK HAVING SHORT MESSAGE SERVICE INTERACTION WITH OTHER NETWORKS

BACKGROUND OF THE INVENTION

1. Technical Field of the Invention

The present invention relates to cellular telephone networks and, in particular, to a cellular telephone network providing for inter-network short message service (SMS) message transmissions.

2. Description of Related Art

In accordance with TIA/EIA Interim Standards 41 and 136 hereinafter referred to as the "IS-41 and 136 Specifications", provision is made for using a short message service (SMS) message to transmit text (i.e., alphanumeric) messages between mobile stations, base stations and mobile switching centers in a cellular telecommunications network. To facilitate this service, the cellular network includes a message center (often located in the mobile switching center itself) to store SMS messages, initiate the transmission of SMS messages to mobile stations and receive SMS messages transmitted from mobile stations. Use of SMS messages is also authorized by the IS-41 and 136 Specifications for the transmission of text messages between two mobile stations over the cellular telecommunications network via the message center (i.e., an intra-network message communication).

Today's society demands access to and communication over, among and between multiple networks such as a local area network (LAN), wide area network (WAN), conventional telephone network and cellular telephone network. While the current IS-41 and 136 Specifications adequately handle the transmission of text messages using SMS message transmissions within the cellular telecommunications network itself, the specifications fail to address the need for text message transmission between the cellular network and other networks (like the conventional telephone network, LAN or WAN) in the form of inter-network communications. The failure of the IS-41 and 136 Specifications to facilitate such inter-network message communications comprises a serious drawback to the specifications that has not yet been addressed by the art or the specification committee.

A crude and inefficient solution to this deficiency, which does however operate within the current IS-136 Specification boundaries, involves assignment of a human operator to the message center to handle the passage of messages between the cellular network and various other networks over which communication may be desired. In accordance with this solution, when a subscriber initiates an inter-network SMS text message at a mobile station and transmits the message to the message center, the human operator then reformats the message for transmission over another network (using a facsimile or e-mail transmission) and attends to the delivery of the message to a third party over that network. Alternatively, when a third party initiates an inter-network message on another network for transmission to the message center, the operator then reformats the message for network transmission (using an SMS message transmission) and attends to the delivery of the message to a certain subscriber mobile station over the cellular network.

There is accordingly a need for a method and system for allowing cellular subscribers to both initiate and receive inter-network message transmissions without invoking human operator interaction or intervention. In particular, there is a need for an automated system and method for facilitating inter-network message communication between mobile station subscribers on a short message service supported cellular network and users of other networks which may be connected thereto.

SUMMARY OF THE INVENTION

The present invention addresses the current inter-network message communication limitations presented by the IS-41 and 136 Specifications for cellular telephone networks by including a functionality in the message center of the cellular telecommunications network that facilitates inter-network message communications. With respect to an SMS message originated by a mobile station, the functionality of the message center analyzes the received message to identify both a designated message delivery network and a destination address on that designated network for message delivery. The received message is then re-formatted (if necessary) for transmission on the designated network, and forwarded in the proper format to the identified destination address via the designated network. With respect to a message originated on a network other than the cellular network, the message center analyzes the received message to identify a subscriber mobile station destination on the cellular network for message delivery. The received message is then re-formatted (if necessary) for transmission on the cellular network, and forwarded in the SMS message format to the identified subscriber mobile station via the cellular network.

In order for the message center to identify the desired network and addressee destination for delivery of the received message, a destination identifier is added to the text field of the originated message. The destination identifier includes both a network designation (identifying the network over which the received message is to be transmitted) and a destination address (identifying the addressee on the designated network to which the received message is to be delivered). For example, a message originated by a mobile station and intended for facsimile delivery to a certain person will include a destination identifier in the text field comprising a network designation of a conventional telephone network and a destination address of that certain person's facsimile telephone number on the telephone network. Similarly, a message originated by the mobile station and intended for e-mail delivery to a certain user will include a destination identifier comprising a network designation of the user's local or wide area network (LAN or WAN) and a destination address of the user's network address on the LAN or WAN. For messages originated outside the cellular network as a facsimile or e-mail and intended for delivery to a cellular subscriber, the text field will include a destination identifier comprising a network designation of the subscriber's cellular network and a destination identifier of the subscriber's mobile station telephone number on the cellular network.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE INVENTION

Figure 1:
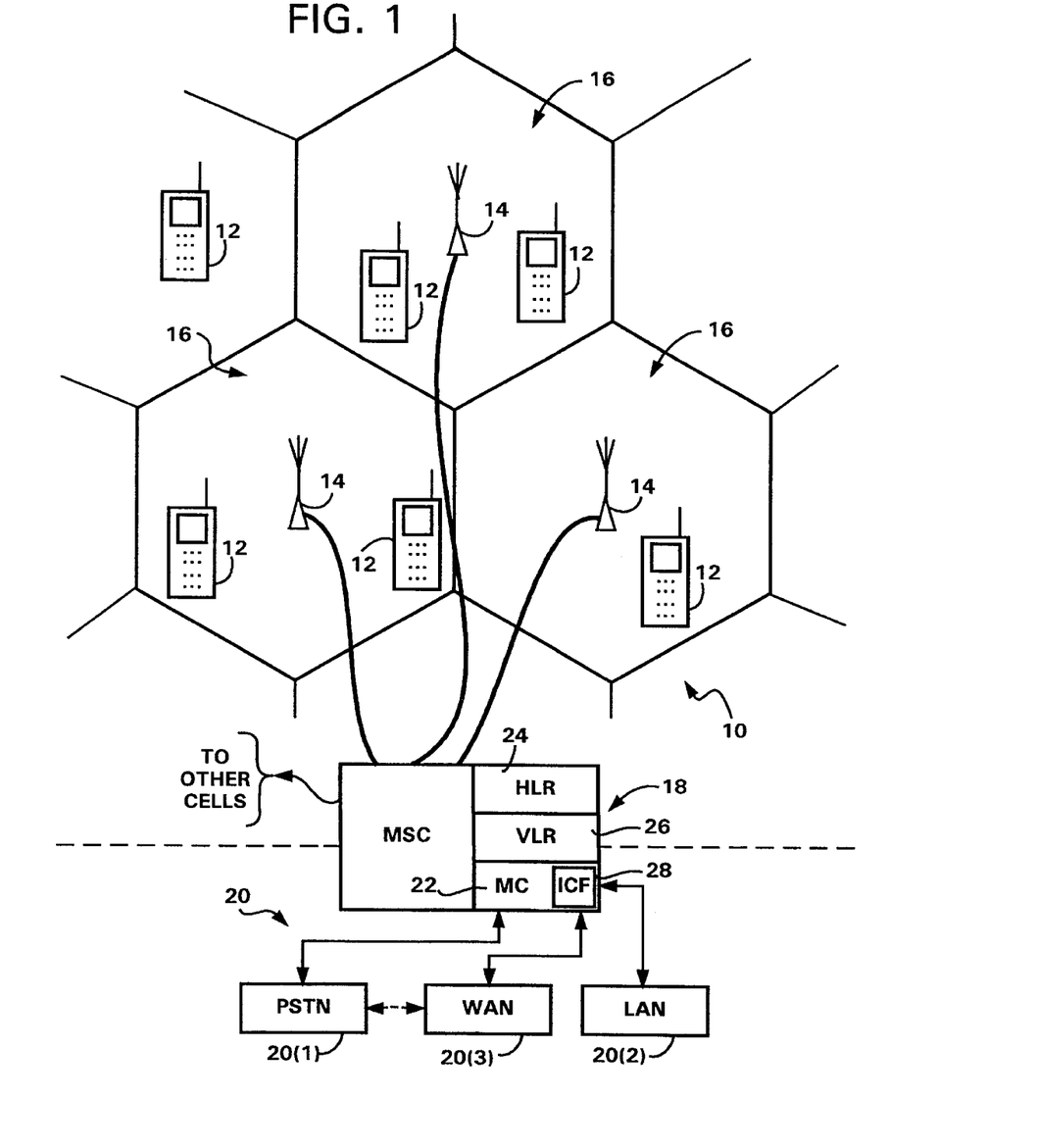
FIG. 1 is a block diagram of a cellular telecommunications network implementing the inter-network communications functionality of the present invention.

Referring now to FIG. 1, there is shown a block diagram of a cellular telecommunications network 10 implementing the inter-network message communications functionality of the present invention. Included in the cellular network 10 are a plurality of mobile stations 12 and base stations 14 that engage in radio-frequency communications with each other. The mobile stations 12 roam throughout a service area which is divided into a plurality of cells 16 wherein each cell is served by one of the plurality of included network base stations 14. The network 10 further includes a mobile switching center (MSC) 18 connected by a radio-frequency or hard wired communications link to each of the base stations 14 in the service area. The cellular network 10 is further connected via the mobile switching center 18 to a number of other non-cellular networks 20 including a conventional telephone network (like a PSTN) 20(1), a local area network (LAN) 20(2), and a wide area network (WAN) 20(3). For a LAN or WAN connection, the mobile switching center 18 preferably comprises either a node on the network or, alternatively, accesses a network node via the telephone network 20(1) as illustrated by the broken line extending between the telephone network and WAN 20(3).

The mobile switching center 18 includes a message center (MC) 22, a home location register (HLR) 24 and a visitor location register (VLR) 26. It will, of course, be understood that the message center, home location register and visitor location register may be alternatively implemented in stand-alone fashion if desired. The message center 22 receives, stores and forwards short message service (SMS) messages, and perhaps other message types, addressed for delivery to and received from the mobile stations 12. The home location register 24 stores permanent data for each subscriber that is independent of the current location of the subscriber. The home location register 24 may further store temporary data concerning the address in the message center 22 of any stored short message service messages, and an indication of a message waiting to be delivered to the mobile station. The visitor location register 26 stores current data for each subscriber including the current or most recently known location of the mobile station 12 for the subscriber, the on/off status of the mobile station, security parameters, and an indication of a message waiting to be delivered to the mobile station.

The message center 22 is of conventional design and operates as is known in the art, but further includes an inter-network communications functionality (ICF) 28 which facilitates the transmission of messages between the cellular network 10 and the other networks 20 connected thereto at the message center. Using the inter-network communications functionality 28, a mobile station 12 can initiate and send a message from the cellular network 10 for delivery in the proper format to a certain addressee/destination over one of the other non-cellular networks 20. Thus, the mobile station 12 can generate an SMS message that is carried over the cellular network 10, converted by the functionality 28 in the message center 22, and then delivered as a facsimile transmission over the conventional telephone network 20(1) or an e-mail transmission over the LAN/WAN 20(2/3). Conversely, the functionality 28 allows a third party to initiate and send a message from one of the other non-cellular networks 20 for delivery to a certain subscriber mobile station 12 (addressee) over the cellular network 10. In this operation, a user can generate an e-mail message that is carried over the LAN/WAN 20(2/3), converted by the functionality 28 in the message center 22, and then delivered as an SMS message over the cellular network 10.

The functionality 28 thus operates to convert among and between any of the many different messaging formats supported by the networks 10 and 20 connected to the message center 22. With reference now to FIGS. 2A–2D, there are illustrated several message formats adapted and modified for transmitting inter-network messages in accordance with the present invention.

Figure 2A:
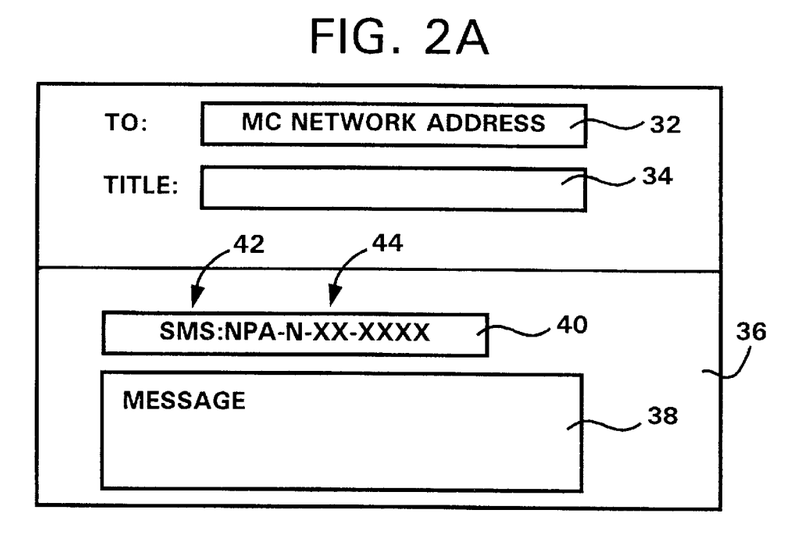
FIGS. 2A–2D illustrate message formats for transmitting inter-network messages in accordance with the present invention.

With specific reference to FIG. 2A, there is shown the format for an e-mail-to-SMS message transmission from either a LAN 20(2) or WAN 20(3) user to a subscriber on the cellular network 10. The format of FIG. 2A comprises three fields: a destination address field 32; a title field 34; and, a text field 36. The destination address field 32 is filled-in by the sender with the network address on the LAN 20(2) or WAN 20(3) for the message center 22 of the cellular network 10. The title field 34 is filled-in with sender selected information not important to the operation of the present invention comprising the title or subject of the e-mail message. The text field 36 includes the alphanumeric text 38 of the message being sent to the subscriber, and also a destination identifier 40 identifying for the functionality 28 of the message center 22 the ultimate destination (addressee) mobile station 12 on the cellular network 10 of the e-mail message.

Figure 2B:
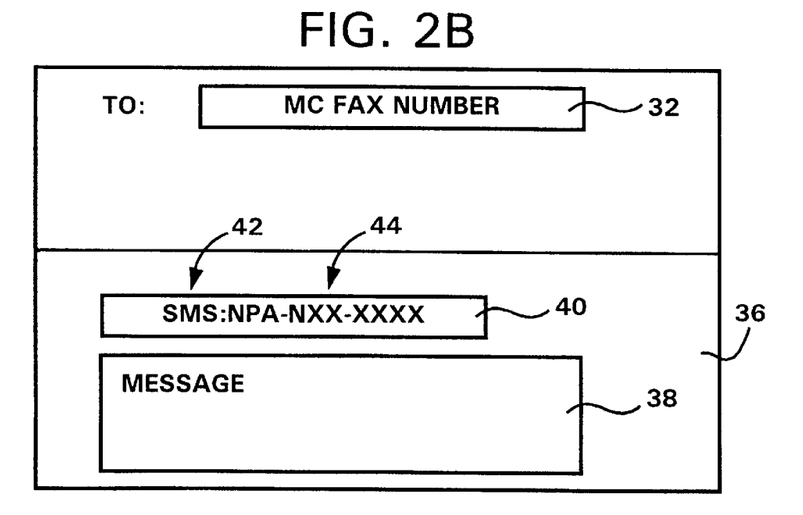

In FIG. 2B there is shown the format for a facsimile-to-SMS message transmission from the conventional telephone network 20(1) to a subscriber on the cellular network 10. Like the e-mail format of FIG. 2A, the facsimile format of FIG. 2B includes a destination address field 32 and a text field 36. The destination address field 32 in this case is filled-in by the sender with the facsimile telephone number on the telephone network 20(1) for the message center 22 of the cellular network 10. The text field 36 includes the alphanumeric text 38 of the message being sent to the subscriber, and a destination identifier 40 identifying for the functionality 28 of the message center 22 the ultimate destination (addressee) mobile station 12 on cellular network 10 of the facsimile message. It will be understood that facsimile images transmissions (pictures, handwritten text, etc.) to mobile stations are not, at this time, possible. It is only recognizable text (e.g., typewritten) in a facsimile message that may be converted (perhaps through a scanning operation performed by or in association with the functionality 28) to an SMS text message for delivery to the mobile station.

Figure 2C:
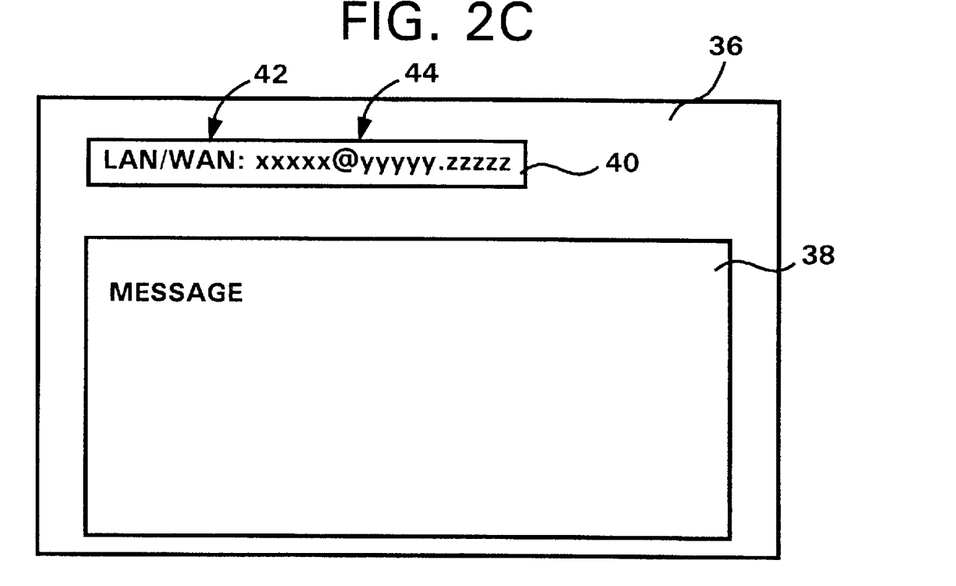

Referring now to FIG. 2C, there is shown the format for an SMS-to-e-mail message transmission from a cellular subscriber on the cellular network 10 to either a LAN 20(2) or WAN 20(3) user. This format includes only a text field 36 comprising the alphanumeric text 38 of the message being sent from the mobile station 12 of the cellular subscriber, and a destination identifier 40 identifying for the functionality 28 of the message center 22 the ultimate destination (addressee) on the LAN 20(2) or WAN 20(3) of the e-mail message.

Figure 2D:
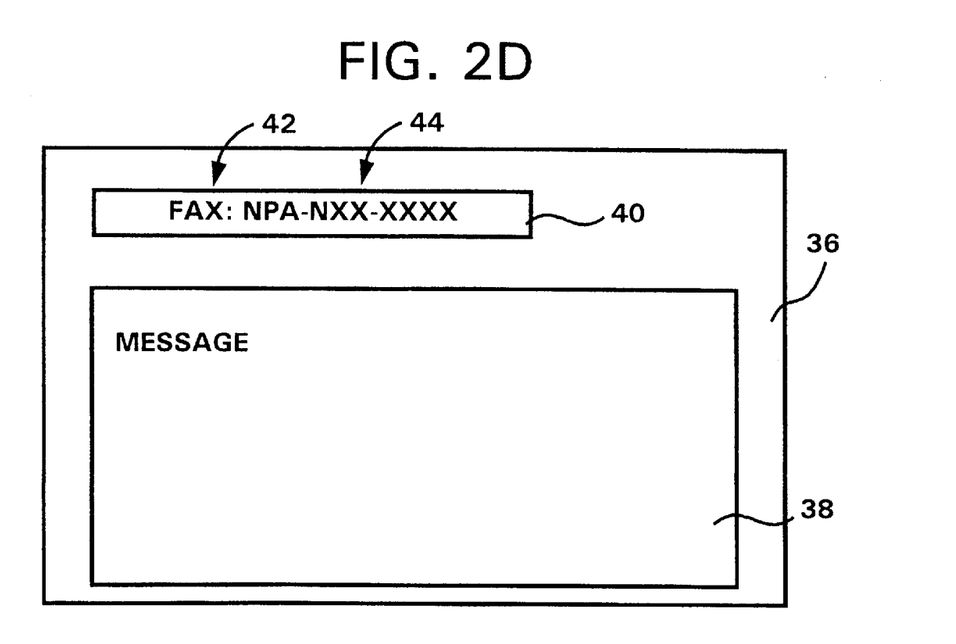

Similarly, with reference to FIG. 2D, the format of an SMS-to-facsimile message transmission from a cellular subscriber on the cellular network 10 to the conventional telephone network 20(1) includes only a text field 36 comprising the alphanumeric text 38 of the message being sent from the mobile station 12 of the cellular subscriber, and a destination identifier 40 identifying for the functionality 28 of the message center 22 the ultimate destination (addressee) on the conventional telephone network 20(1) of the facsimile message.

In FIGS. 2C and 2D, no destination address field (32 in FIGS. 2A and 2B) identifying the message center 22 as the destination for the SMS message transmission is needed because such messages are automatically routed from the mobile station 12 to the message center.

The destination identifier 40 in FIGS. 2A–2D includes both a network designation (identifying the network over which the message is to be transmitted for delivery) 42 and a destination address (identifying the addressee on the designated network to which the message is to be delivered) 44 separated from each other by a colon or other appropriate delimiter (e.g., a hyphen, slash, etc.). In the case of the e-mail and facsimile message formats of FIGS. 2A and 2B for messages generated for initial transmission over one of the other networks 20, the network designation 42 is "SMS" (or any other appropriate designation) identifying the cellular network 10 as the network over which the message is to be transmitted after conversion to an SMS message. The destination address 44 of the identifier 40 is "NPA-NXX-XXXX" identifying the telephone number of the subscriber to whom the SMS message is to be delivered. In the case of the e-mail message format of FIG. 2C, for messages generated for initial transmission over the cellular network 10, the network designation 42 is "LAN" or "WAN" (or any other appropriate designation) identifying the LAN 20(2) or WAN 20(3), respectively, as the network over which the message is to be transmitted after conversion as an e-mail message. The destination address 44 in the identifier 40 is "xxxxx@yyyyy.zzzzz" identifying the network address of the user to whom the e-mail message is to be delivered. This address may comprise an Internet, world wide web or other network address. With the facsimile message format of FIG. 2D, for messages generated for initial transmission over the cellular network 10, the network designation 42 is "FAX" (or any other appropriate designation) identifying the conventional telephone network 20(1) as the network over which the message is to be transmitted after conversion as a facsimile message. The destination address 44 in the identifier 40 is "NPA-NXX-XXXX" identifying the facsimile telephone number of the person to whom the facsimile message is to be delivered.

Figure 3:
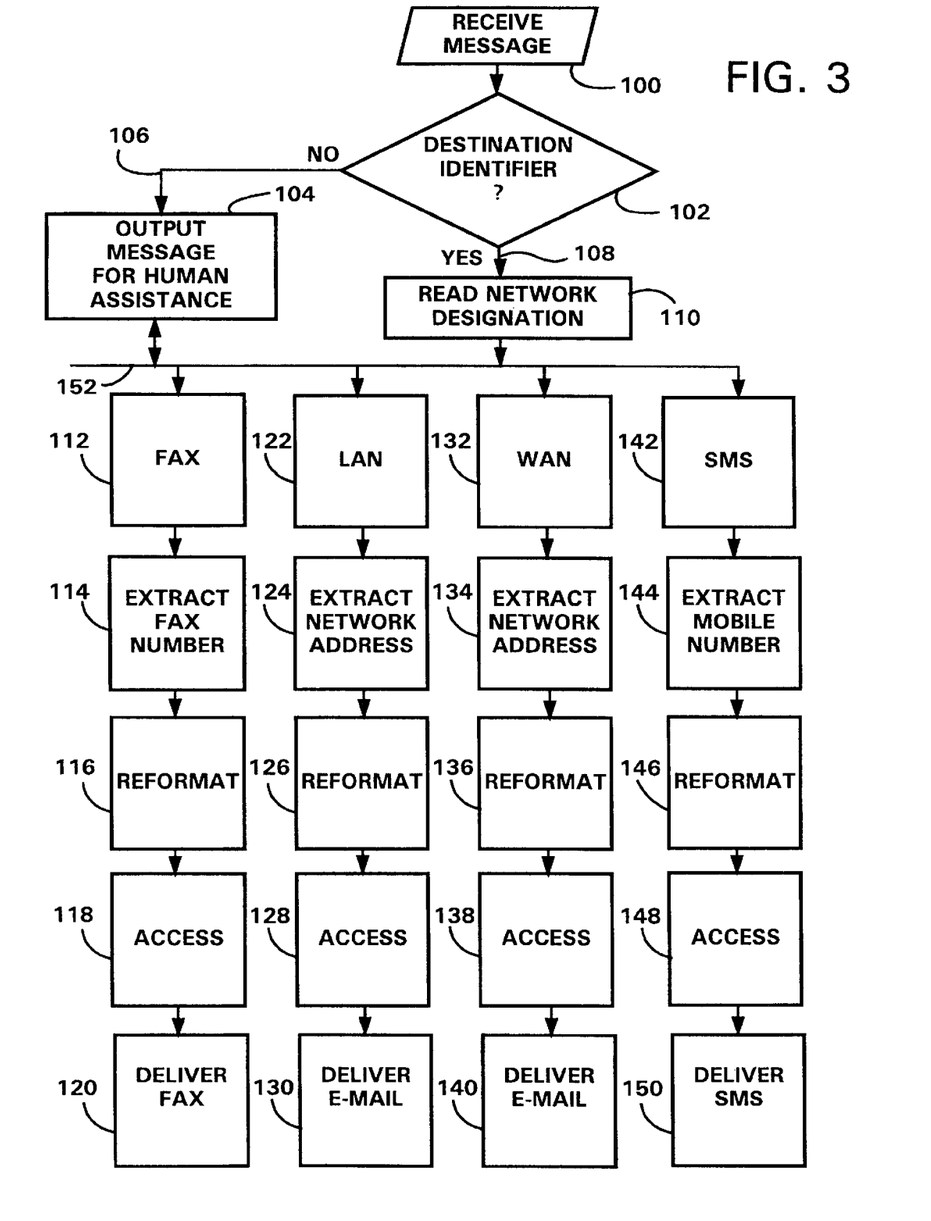
FIG. 3 is a flow diagram illustrating operation of the present invention for handling an inter-network message received in one of the formats of FIGS. 2A–2D.

Reference is now made to FIG. 3 wherein there is shown a flow diagram illustrating operation of the functionality 28 of the message center 22 of the present invention for handling a received inter-network message having one of the formats shown in FIGS. 2A–2D. At step 100, an inter-network message is received by the message center 22 from either the cellular network 10 or other network 20. The received message may comprise a facsimile message or an e-mail message originated in one of the other networks 20 (in one of the formats shown in FIGS. 2A and 2B) and intended for delivery over the cellular network 10 as an SMS message. Alternatively, the received message may comprise an SMS message originated at a mobile station 12 (in one of the formats shown in FIGS. 2C and 2D) and intended for delivery over one of the other networks 20 as a facsimile message or an e-mail message.

Following receipt of the message, the functionality 28 converts the received message. First, analysis of the text field 36 of the message is made to determine in decision step 102 whether a destination identifier 40 has been included. In one embodiment, the destination identifier 40 is found by searching the text field 36 for portions of text surrounded by quotation marks or other appropriate delimiters (e.g., brackets, parenthesis, hyphens, etc.). Alternatively, the destination identifier could be in the first piece of data in the received message (provided the data complies with the format of the destination identifier 40. In the event no destination identifier 40 is found (branch 106), the received message cannot be automatically delivered by the functionality 28, and is instead output in step 104 to a console or printer where human operator assistance is preferably made available on an "as needed" basis to attend to message delivery. Once the destination identifier 40 is found (branch 108), the network designation 42 portion of the identifier is read in step 110.

If the read network designation 42 comprises the term "FAX", as in step 112, the functionality 28 extracts the facsimile telephone number "NPA-NXX-XXXX" from the destination address 44 in step 114. Any re-formatting of the received message (in this case an SMS message) necessary for facsimile transmission is then performed in step 116. The conventional telephone network 20(1) is then accessed by the functionality 28 of the message center 22 in step 118 following message conversion, and the received and converted message is delivered as a facsimile message over the accessed network in step 120.

If the read network designation 42 instead comprises the term "LAN", as in step 122, the functionality 28 extracts the network address "xxxxx@yyyyy.zzzzz" from the destination address 44 in step 124. Any re-formatting of the received message (in this case an SMS message) necessary for LAN e-mail transmission is then performed in step 126. The LAN 20(2) is then accessed by the functionality 28 of the message center 22 in step 128 following message conversion, and the received and converted message is delivered as an e-mail message over the accessed network in step 130.

If the read network designation 42 alternatively comprises the term "WAN", as in step 132, the functionality 28 extracts the network address "xxxxx@yyyyy.zzzzz" from the destination address 44 in step 134. Any re-formatting of the received message (in this case an SMS message) necessary for WAN e-mail transmission is then performed in step 136. The WAN 20(3) is then accessed by the functionality 28 of the message center 22 in step 138 following message conversion, and the received and converted message is delivered as an e-mail message over the accessed network in step 140.

If the read network designation 42 instead comprises the term "SMS", as in step 142, the functionality 28 extracts the subscriber mobile station 12 telephone number "NPA-NXX-XXXX" from the destination address 44 in step 144. Any re-formatting of the received message (in this case a facsimile or e-mail message) necessary for SMS message transmission is then performed in step 146. The cellular network 10 is then accessed by the functionality 28 of the message center 22 in step 148 following message conversion, and the received and converted message is delivered as an SMS message over the accessed network in step 150.

If the read network designation 42 alternatively comprises some other term (branch 152), the received message cannot be automatically delivered by the functionality 28, and is instead output in step 104 to a console or printer where human assistance is preferably made available on an "as needed" basis to attend to message delivery.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. In particular, it should be noted that although disclosed in connection with operation within one particular type of cellular system, the present invention may be used in any cellular telephone system supporting intra-network textual message delivery.

What is claimed is:

1. A communications system, comprising:
    a cellular communications network comprising a plurality of mobile stations engaging in cellular telephone communications as well as short message service message communications wherein at least one short message service message contains a destination address in a non-cellular communications network as well as a network designation identifying that non-cellular communications network for the destination address;
    a plurality of non-cellular communications networks for carrying network message communications; and
    means connected between the cellular and non-cellular communications networks for facilitating inter-network message communications, said means functioning to perform a conversion of short message service messages originated at mobile stations on the cellular network to network messages transmitted for delivery by a certain one of the non-cellular communications networks to the destination address and to identify that certain one of the non-cellular communication networks for converting and delivering the network message from the network designation.

2. The communications system as in claim 1 wherein the non-cellular communications network comprises a conventional telephone network and the network messages comprise facsimile messages.

3. The communications system as in claim 2 wherein the destination address comprises a facsimile telephone number, the means for facilitating further functioning after short message service message conversion to deliver the converted short message service message as a facsimile message transmitted over the conventional telephone network to the facsimile telephone number identified in the non-cellular communications network destination address.

4. The communications system as in claim 1 wherein the non-cellular communications network comprises a local area network (LAN) or wide area network (WAN) and the network messages comprise e-mail messages.

5. The communications system as in claim 4 wherein the destination address comprises a LAN/WAN address, the means for facilitating further operating after short message service message conversion to deliver the converted short message service message communication as an e-mail message transmitted over the LAN or WAN to the LAN/WAN address identified in the non-cellular communications network destination address.

6. The communications system as in claim 1 wherein the means for facilitating further operates after short message service message conversion to forward the network message comprising the converted short message service message to that certain one of the plurality of non-cellular communications networks identified in the network designation.

7. A message center for a cellular communications network, the cellular communications network supporting the transmission of short message service messages to and from mobile stations, the message center including an inter-network communications functionality facilitating the transmission of messages between the cellular communications network and a plurality of non-cellular communications networks connected thereto wherein each of the messages contains a destination address in a non-cellular communications network as well as a network designation identifying that non-cellular communications network for the destination address, the non-cellular communications network supporting the transmission of network messages, said inter-network communications functionality operating to convert short message service messages originated at mobile stations to network messages for transmission over a certain one of the non-cellular communications networks to the destination address and to identify that certain one of the non-cellular communications networks for converting the network message from the network designation in the short message service message.

8. The message center as in claim 7 wherein the non-cellular network comprises a local or wide area network (LAN/WAN) and wherein the destination address comprises a LAN/WAN address, the functionality further operating after short message service message conversion to transmit an e-mail message comprising the converted short message service message to the LAN/WAN address.

9. The message center as in claim 7 wherein the non-cellular communications network comprises a conventional telephone network and wherein the destination address comprises a facsimile telephone number, the functionality further operating after short message service message conversion to transmit a facsimile message comprising the converted short message service message to the facsimile telephone number.

10. The message center as in claim 7 wherein the functionality further operates after short message service message conversion to forward the network message comprising the converted short message service message for transmission over that certain one of the plurality of non-cellular communications networks identified in the network designation.

11. A method for inter-network message communications, comprising the steps of:
    receiving a short message service message originated at a mobile station of a cellular communications network, said message received at an interconnection point between the cellular communications network and a plurality of non-cellular communications networks, and said message including a destination address in a non-cellular communications network as well as a network designation identifying that non-cellular communications network for the destination address;
    converting the received short message service message for transmission as a network message over a certain one of the non-cellular communications networks, the step of converting including the step of identifying the certain one of the non-cellular communications networks from the included network designation and the step of identifying a destination on that certain non-cellular network for the network message comprising the converted short message service message from the included destination address; and
    delivering the network message over the certain non-cellular communications network to the identified destination address.

12. The method as in claim 11 wherein the non-cellular network comprises a conventional telephone network, and the step of converting further includes the step of converting the short message service message to a facsimile message.

13. The method as in claim 6 wherein the short message service message includes a field containing a facsimile telephone number for the destination address of the network message, and the step of identifying further includes the step of extracting the facsimile telephone number from the short message service message destination address.

14. The method as in claim 11 wherein the non-cellular network comprises a local or wide area network (LAN/WAN), and the step of converting further includes the step of converting the short message service message to an e-mail message.

15. The method as in claim 14 wherein the short message service message includes a field containing a LAN/WAN address for the destination address of the network message, and the step of identifying comprises the step of extracting the LAN/WAN address from the short message service message destination address.

16. A method for inter-network message communications, comprising the steps of:

receiving a network message originated on a non-cellular communications network, said message received at an interconnection point between the non-cellular communications network and a cellular communications network including a plurality of mobile stations, said message including a primary address for the network message comprising an address within the non-cellular communications network for the interconnection point and further including a secondary address for the network message comprising an address within the cellular communications network for a certain one of the mobile stations;

converting the received network message for transmission as a short message service message over the cellular communications network, the step of converting including the step of identifying a destination mobile station on the cellular network for delivery of the short message service message comprising the converted network message from the included secondary address; and delivering the short message service message over the cellular communications network to the identified destination mobile station.

17. The method as in claim 16 wherein the non-cellular network comprises a conventional telephone network, and the step of converting further includes the step of converting the network message comprising a facsimile message to a short message service message.

18. The method as in claim 17 wherein the facsimile message includes a field containing a cellular telephone number for the secondary address, and the step of identifying comprises the step of extracting the cellular telephone number from the facsimile message.

19. The method as in claim 16 wherein the non-cellular network comprises a local or wide area network (LAN/WAN), and the step of converting further includes the step of converting the network message comprising an e-mail message to a short message service message.

20. The method as in claim 19 wherein the e-mail message includes a field containing a cellular telephone number for the secondary address, and the step of identifying comprises the step of extracting the cellular telephone number from the e-mail message.

21. A communications system, comprising;

a cellular communications network comprising a plurality of mobile stations engaging in cellular telephone communications as well as short message service message communications;

a non-cellular communications network for carrying network message communications wherein at least one network communication contains a primary address for the network message comprising an address within the non-cellular communications network for a network interconnection point and further including a secondary address for the network message comprising an address within the cellular communications network for a certain one of the mobile stations; and means connected between the cellular and non-cellular communications networks at the addressed network interconnection point for facilitating inter-network message communications, said means functioning to perform a conversion of network messages originated on the non-cellular communications network to short message service messages transmitted for delivery to mobile stations by the cellular communications network and to identify the certain one of the mobile stations in the cellular communications network from the included secondary address for delivery of the short message service message.

22. The communications system as in claim 21 wherein the non-cellular communications network comprises a conventional telephone network and the network messages comprise facsimile messages.

23. The communications system as in claim 22 wherein each facsimile message originated on the conventional telephone network includes a cellular telephone number for the secondary address, the means for facilitating further functioning after network message conversion to deliver the converted facsimile message as a short message service message over the cellular communications network to the cellular telephone number identified in the secondary address.

24. The communications system as in claim 21 wherein the non-cellular communications network comprises a local area network (LAN) or wide area network (WAN) and the network messages comprise e-mail messages.

25. The communications system as in claim 24 wherein each e-mail message originated on the LAN/WAN includes a cellular telephone number as the secondary address, the means for facilitating further operating after network message conversion to deliver the converted e-mail message as a short message service message communication transmitted over the cellular communications network to the cellular telephone number identified in the secondary address.

26. A message center for a cellular communications network, the cellular communications network supporting the transmission of short message service messages to and from mobile stations, the message center including an inter-network communications functionality facilitating the transmission of messages between the cellular communications network and a plurality of non-cellular communications networks connected thereto wherein the messages contain a destination address, the non-cellular communications networks supporting the transmission of network messages, said inter-network communications functionality operating to;

convert network messages originated on the non-cellular communications network to short message service messages for transmission over the cellular communications network and delivery to a certain mobile station identified by the destination address; and convert short message service messages originated on the cellular communications network to network messages formatted for a certain one of the non-cellular communications networks identified in an included network designation for transmission over the non-cellular communications network and delivery to a certain entity identified by the destination address.

27. The message center as in claim 26 wherein each network message originated on the non-cellular communications network includes as the destination address a cellular telephone number of a certain mobile station, the functionality further operating after network message conversion to transmit a short message service message comprising the converted network message to the certain mobile station over the cellular network.

* * * * *

UNITED STATES PATENT AND TRADEMARK OFFICE
CERTIFICATE OF CORRECTION

PATENT NO. : 5,946,629
DATED : Aug. 31, 1999
INVENTOR(S) : Sawyer et al.

It is certified that error appears in the above-identified patent and that said Letters Patent is hereby corrected as shown below:

Column 9, line 60     Replace "comprising;"
                          With --comprising:--

Column 10, line 55    Replace "to;"
                          With --to:--

Signed and Sealed this

Seventh Day of March, 2000

*Attest:*

*Attesting Officer*

Q. TODD DICKINSON

*Commissioner of Patents and Trademarks*